United States Patent
Chen

(10) Patent No.: US 10,203,498 B2
(45) Date of Patent: Feb. 12, 2019

(54) LONG DISTANCE IMAGING HEAD-UP DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 53 days.

(21) Appl. No.: 15/400,974

(22) Filed: Jan. 7, 2017

(65) Prior Publication Data

US 2018/0196259 A1    Jul. 12, 2018

(51) Int. Cl.
*B60K 35/00* (2006.01)
*G02B 27/01* (2006.01)

(52) U.S. Cl.
CPC .......... *G02B 27/0101* (2013.01); *B60K 35/00* (2013.01); *G02B 27/0149* (2013.01); *B60K 2350/1072* (2013.01); *B60K 2350/2052* (2013.01); *B60K 2350/2065* (2013.01); *B60K 2350/40* (2013.01); *G02B 2027/013* (2013.01); *G02B 2027/0141* (2013.01); *G02B 2027/0159* (2013.01)

(58) Field of Classification Search
CPC ............ G02B 27/0172; G02B 27/0101; G02B 2027/0118; G02B 2027/0178; G02B 2027/0123; G02B 2027/011; G02B 2027/013; G02B 27/017; G02B 27/0149; G02B 2027/015; G02B 2027/014; G02B 2027/0138; G02B 27/01; G02B 27/0176; G02B 5/30; B60K 35/00; B60K 2350/2052; B60K 37/04; B60K 2350/106; B60K 2350/1072; B60K 2350/2013; B60K 2350/2021; B60K 2350/2065; B60K 2350/2073; B60K 2350/2086; B60K 2350/352; B60K 2350/921; B60K 2350/941; B60K 28/066

See application file for complete search history.

(56) References Cited

U.S. PATENT DOCUMENTS

| | | | | |
|---|---|---|---|---|
| 6,160,666 A | * | 12/2000 | Rallison | G02B 27/0101 345/7 |
| 7,936,518 B2 | * | 5/2011 | Takahashi | G02B 27/01 359/630 |
| 2016/0320616 A1 | * | 11/2016 | Ichii | G02B 27/0179 |

* cited by examiner

*Primary Examiner* — Thomas K Pham
*Assistant Examiner* — Sharrief I Broome
(74) *Attorney, Agent, or Firm* — Guice Patents PLLC

(57) ABSTRACT

The present invention relates to a long distance imaging head-up display device, which includes an imaging projection module, a reflective diffuser and a concave mirror module, wherein a reflective diffuser is used with a concave mirror module to increase a reflective distance, to thereby obtain a longer optical path distance, so as to project image to a far distance under the same magnification of concave mirror, to reduce visual vertigo and obtain the best visual effects for drivers, to thereby improve driving safety.

10 Claims, 9 Drawing Sheets

LONG DISTANCE IMAGING HEAD-UP DISPLAY DEVICE

BACKGROUND OF THE INVENTION a) Field of the Invention

The present invention relates to a long distance imaging head-up display device and, more particularly, to a head-up display device for drivers to reduce visual vertigo, wherein a reflective diffuser is used with a concave mirror module to increase a reflective distance, to thereby obtain a longer optical path distance, so as to project image to a far distance under the same magnification of concave mirror, to reduce visual vertigo and obtain the best visual effects for drivers, to thereby improve driving safety.

b) Description of Prior Art

Nowadays, head-up display technology used in vehicles is not as complicated as the head-up displays used in airplanes; it is an optical system, and it is generally consisted of two main devices, a projector and a combiner, the projector is consisted of a signal light source, a projection mirror and other optical elements, the signal light source of the projector is consisted of a LCD monitor or a CRT cathode ray tube, light is emitted from the signal light source, and then projected to the combiner on a glass (or a special transparent screen) by the projector, and the combiner is provided to show texts or images.

As shown in FIG. 1, it is a schematic diagram of a head-up display of the cited reference U.S. Pat. No. 7,936,518, the head-up display includes an infrared emission unit 5A, which is provided to emit an infrared ray to a user DA; a mirror element 3A, which is provided to emit a visible light LA reflected from a display 2A towards a concave mirror 4A, and emit the infrared ray reflected from the user DA and the concave mirror 4A; multiple imaging units 6A, 7A faced the concave mirror 4A are provided to sense infrared ray, each image is from different direction; and an image processing unit 8A, the concave mirror 4A is provided to project the visible light LA to a windshield WA, and reflect a virtual image VA to eyes of the user DA.

Based on the concave mirror principle that the virtual image distance is the object optical path length multiply by magnification of the concave mirror, the virtual image distance could be large if: (1) the magnification of the concave mirror may be increased, however, an ideal lens could not be produced due to process of concave mirrors that the virtual images received by two eyes could not be exactly the same, thus the imaging error is larger if the magnification is greater, the imaging error received by two eyes may cause viewers feel dizzy, the magnification would usually be controlled within seven times for comfort of viewing; (2) the object optical path length may be enlarged, however, a head-up display is usually set inside the dashboard in front of the driver, the space is limited, a reflector is additionally set between the optical machine and the concave mirror to let optical path be reflected back and forth for enlarging the object optical path length, but the virtual image distance of a common head-up display could only achieve 2.5 meter from driving eyes due to length restrictions.

Vehicle navigation is mainly provided to guide drivers to switch to a correct lane or to warn for keeping distance to front vehicles. However, head-up displays often draw drivers' attention away from road for navigation, so it is obviously not a good operation mode. If the guidance signs could be pasted on the images of roads or warning front vehicles, drivers may not divert their attention, so it is the ideal way of giving information for drivers, and the key to the problem is how to enlarge the display distance of head-up displays to directly paste signals on roads or warning front vehicles, it is an important subject to be solved.

In order to solve the aforementioned technical bottlenecks, the industry has proposed various solutions, related technologies may be referred to cited references TW I443377, TW I506299, TW 201624101, CN 201610134321, TW 201410829066, CN201510649759, CN201520418145, TW I446001.

The above cited references have already disclosed related head-up display technology, but there are some drawbacks commonly existed in use:

1. Refer to the above cited references, single projection device is provided to project vertical split screen in some of them, but the drawback is that the projected standard distance image is too short, drivers may easily experience visual dizziness when watching it and then driving safety may be affected.

2. Although a standard distance image and a longer distance image could be projected by using two or more projection devices or more split screen in some of the cited references, multiple projection devices are mostly set on the same location, and the provided images are mostly horizontal split screens in the same horizontal plane without vertical split screens, thus it is not easily to precisely paste navigation Guidance signs on the roads or warning front vehicle, so that navigation guidance effect may be greatly reduced.

SUMMARY OF THE INVENTION

In view of the above drawbacks of conventional head-up display devices, the inventor finally completed the long distance imaging head-up display device of the present invention after numerous improvements, namely, the object of the present invention is to provide a head-up display device for drivers to reduce visual vertigo, the reflective diffuser of the present invention is used with a concave mirror module to increase a reflective distance in a limited space, to obtain a longer optical path distance, so as to project image to a far distance under the same magnification of concave mirror, to reduce visual vertigo and obtain the best visual effects for drivers, to thereby improve driving safety.

To achieve the object, the long distance imaging head-up display device of the present invention, including:

an imaging projection module, which is set on a dashboard under a windshield of a vehicle;

a reflective diffuser, which is set on a border between a roof and the windshield of the vehicle, output light of the imaging projection module is projected on the reflective diffuser and provided to image on the reflective diffuser, so that the reflective diffuser is provided to be a screen for displaying images;

a concave mirror module, which is set on the dashboard under the windshield of the vehicle, the concave mirror module is provided to enlarge images of the reflective diffuser;

by the above structure, a longer optical path distance is obtained under the same distance between the reflective diffuser and the concave mirror module without wasting space, thus, the feature is: virtual images are provided to obtain a farther projection distance under the same concave mirror magnification.

The imaging projection module is a Digital Light Processing (DLP) device.

The concave mirror module is set under the dashboard, the concave mirror module is covered by a transparent dust cover.

The concave mirror module is set above the dashboard, the concave mirror module is set in a housing.

The concave mirror module includes a concave mirror and a motor gear set, a reflection angle of the concave mirror is provided to be adjusted by rotation of the motor gear set.

The concave mirror module consists of the concave mirror and multiple reflection lenses.

The reflective diffuser further includes a rotating shaft, the rotating shaft is provided to rotate for adjusting the location of images projected below the windshield.

The concave mirror module is provided to enlarge images of the reflective diffuser and project to drivers' eyes.

The concave mirror module is provided to enlarge images of the reflective diffuser and project to the windshield, to thereby reflect to drivers' eyes by the windshield.

The long distance imaging head-up display device of the present invention further includes a reflection film, the reflection film is set on the windshield.

The long distance imaging head-up display device of the present invention, reflection distance could be increased in a limited space by using the reflective diffuser with the concave mirror module, so as to obtain a longer optical path distance, thus, the feature is: virtual images are provided to obtain a farther projection distance under the same concave mirror magnification.

The long distance imaging head-up display device of the present invention, the feature is that a longer optical path distance could be obtained by imaging of the concave mirror of the concave mirror module by using virtual image principle, so virtual images could be projected to a far distance under the same magnification of concave mirror, to thereby obtain the best visual effects for drivers, to reduce visual vertigo, to thereby improve driving safety.

DETAILED DESCRIPTION OF THE INVENTION

Figure 1:
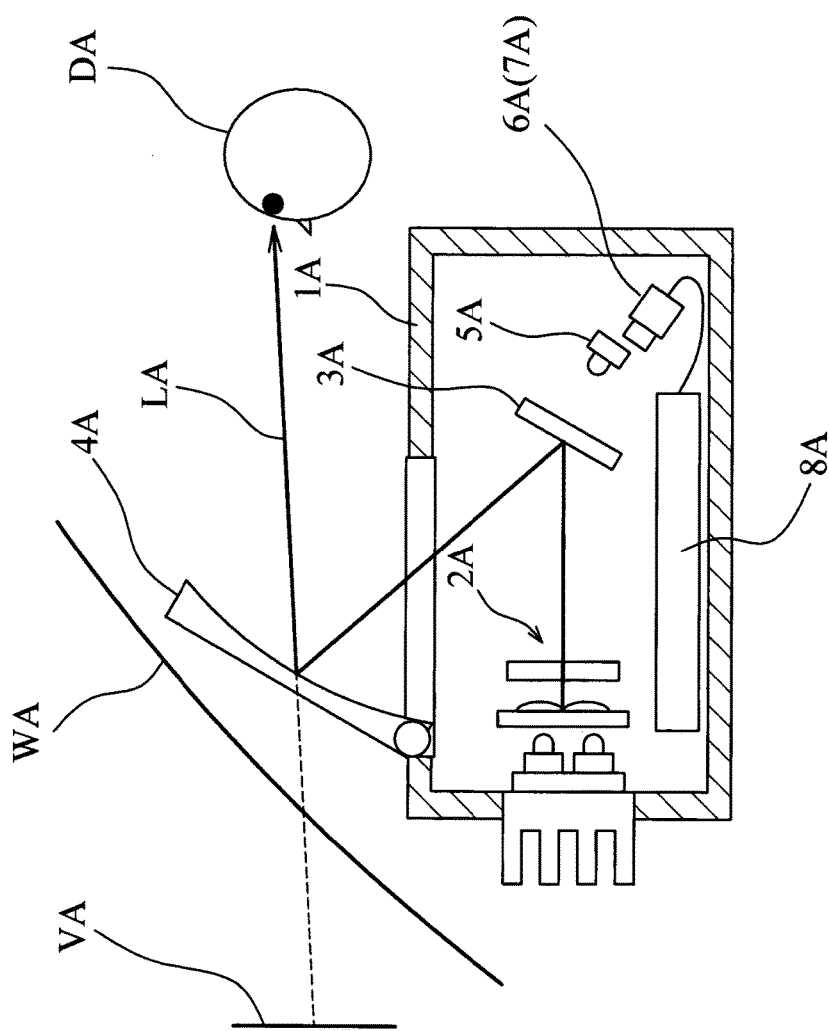
FIG. 1 is a schematic diagram of a conventional head-up display device.
Figure 2:
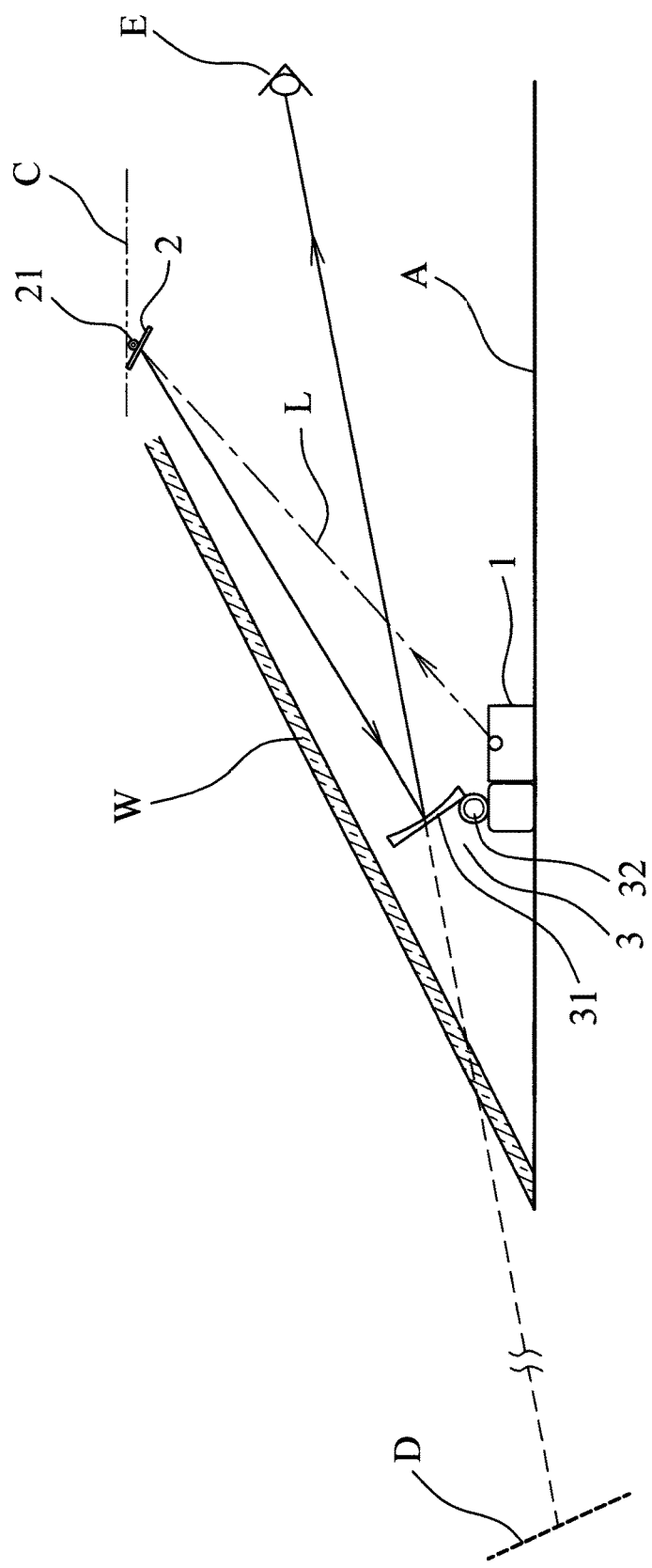
FIG. 2 is a schematic diagram of the first embodiment of the present invention.

Please refer to FIG. 2, which shows the first embodiment of the long distance imaging head-up display device of the present invention, including:

an imaging projection module 1, which is set on a dashboard A under a windshield W of a vehicle, is provided to project images, the imaging projection module 1 is a Digital Light Processing (DLP) device, the imaging projection module 1 utilizes the imaging technology used in projectors and rear-projection televisions;

a reflective diffuser 2, which is set on a border between a roof C and the windshield W of the vehicle, optical path L of output light of the imaging projection module 1 is projected on the reflective diffuser 2 and provided to image on the reflective diffuser 2, so that the reflective diffuser 2 is provided to be a screen for displaying images; the reflective diffuser 2 further includes a rotating shaft 21, the rotating shaft 21 is provided to rotate for adjusting the location of images projected below the windshield W;

a concave mirror module 3, which is set on the dashboard A, the concave mirror module 3 includes a concave mirror 31 and a motor gear set 32, a reflection angle of the concave mirror 31 is provided to be adjusted by rotation of the motor gear set 32, the concave mirror module 3 is provided to enlarge images of the reflective diffuser 2; the concave mirror module 3 is provided to enlarge images of the reflective diffuser 2 and project to drivers' eyes E;

by the above structure, a longer optical path distance is obtained under the same distance between the reflective diffuser 2 and the concave mirror module 3 without wasting space, wherein principle of virtual imaging is imaging by using the concave mirror 31, the imaging formula of concave mirror is: $1/p+1/q=1/f$, wherein f: focal distance, q: object distance, p: image distance, thus, the feature is: virtual images are provided to obtain a farther projection distance under the same concave mirror magnification.

Figure 3:
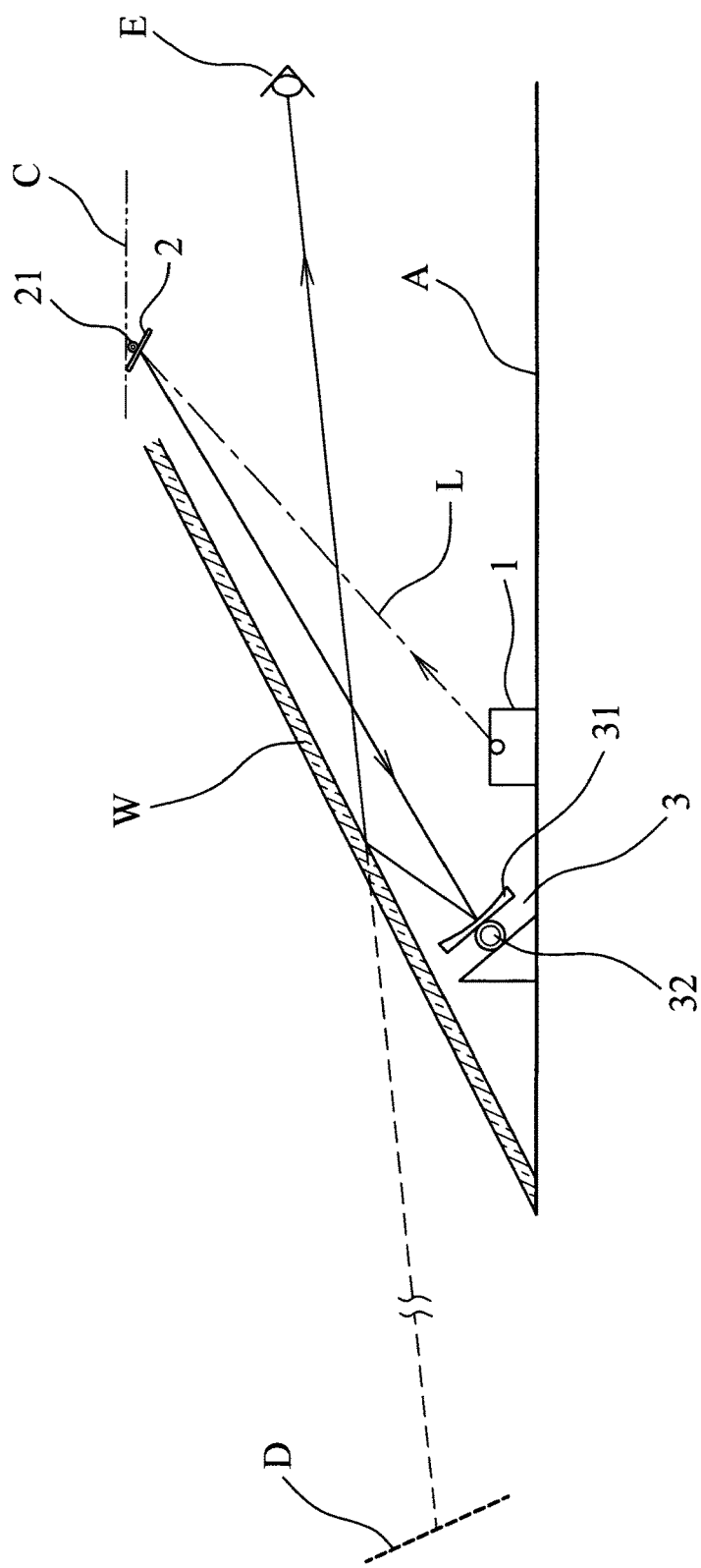
FIG. 3 is another schematic diagram of the first embodiment of the present invention.

Because the concave mirror module 3 is set on a higher place of the dashboard A, the optical path L reflected by the concave mirror 31 could let images be enlarged and directly reflected to drivers' eyes E by the concave mirror 31 without reflecting by the windshield W; besides, the reflected optical path L of the present invention, which could be shown as FIG. 3, the concave mirror module 3 could be set on a lower position of the dashboard A, so that the optical path L projected by the concave mirror module 3 could pass through the windshield W and reflect to drivers' eyes E.

Figure 4:
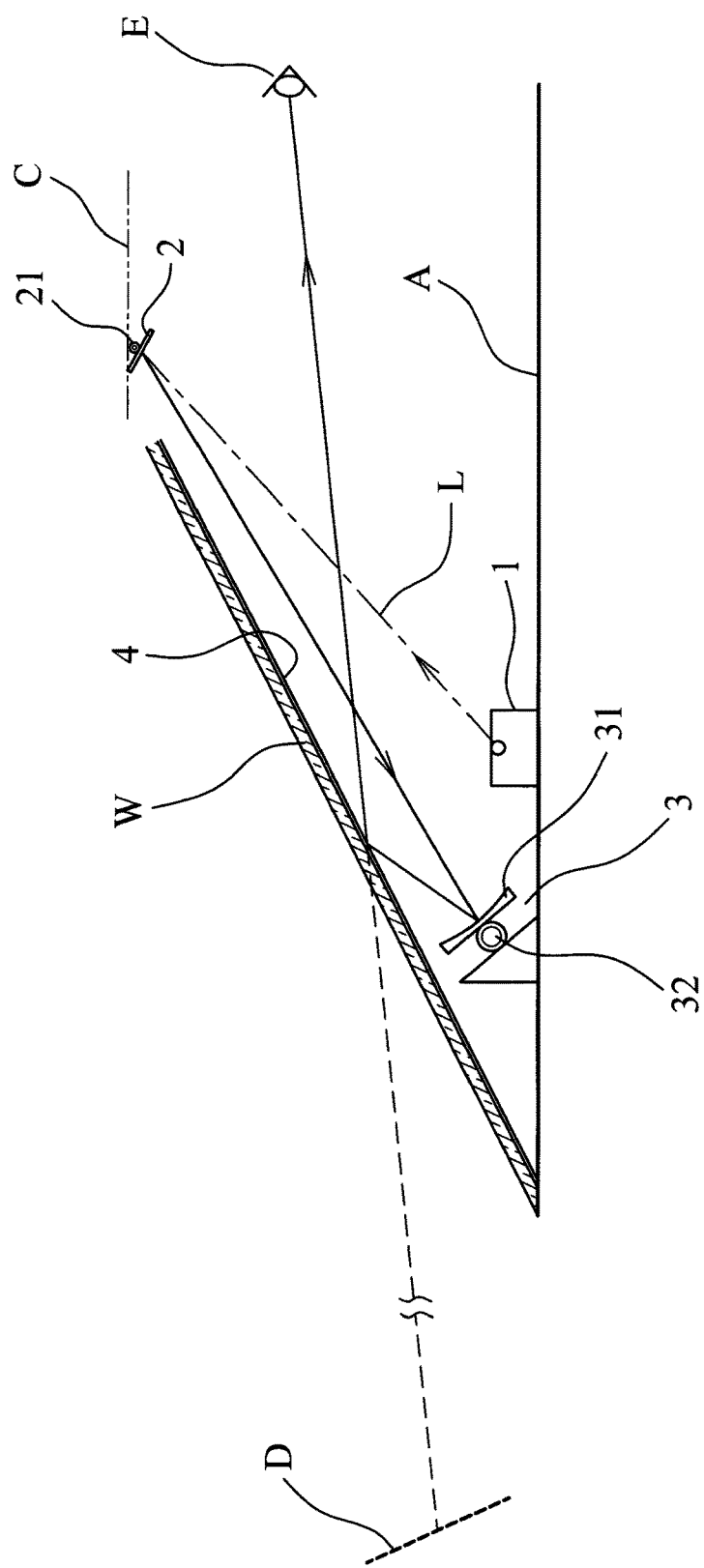
FIG. 4 is a schematic diagram of setting a reflection film on the windshield in the first embodiment of the present invention.
Figure 9:
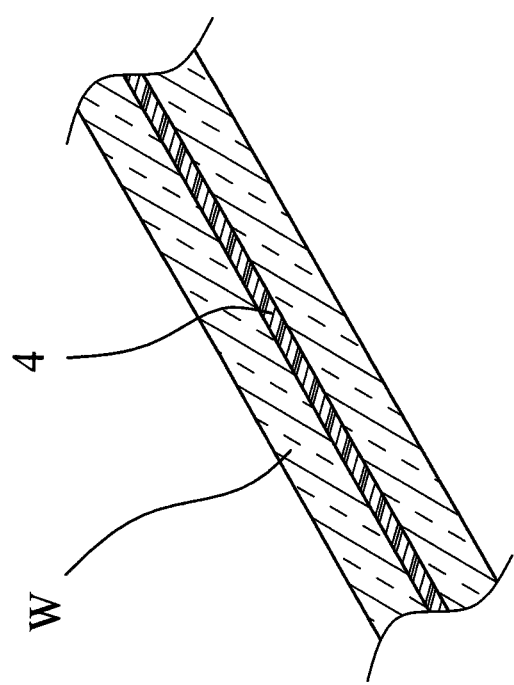
FIG. 9 is a schematic diagram of another example of setting a reflection film on the windshield of the present invention.

As shown in FIG. 4, the long distance imaging head-up display device of the present invention further includes a reflection film 4, the reflection film 4 is set on the windshield W to improve reflectivity of the virtual image D, the reflection film 4 is set on an inner side of the windshield W or set in the windshield W (as shown in FIG. 9).

Figure 5:
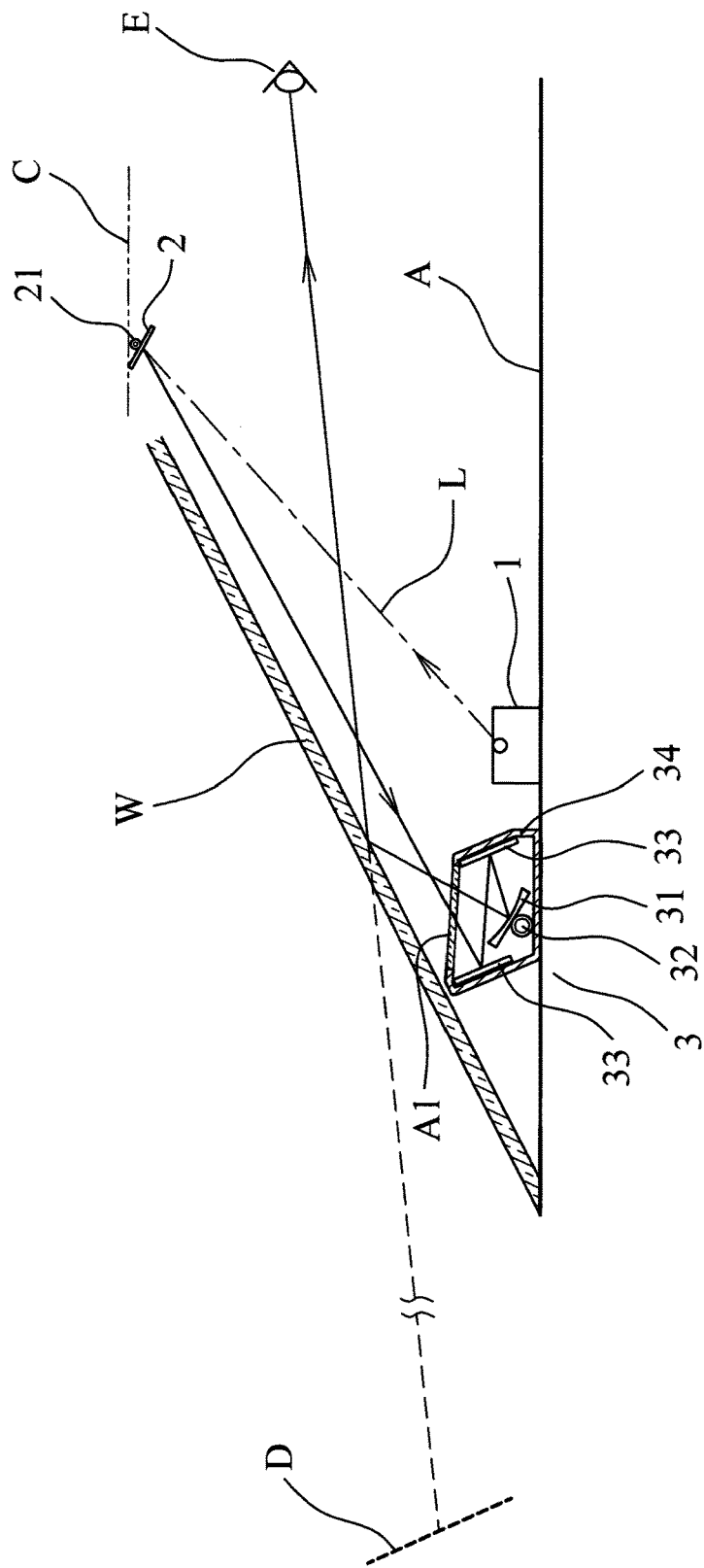
FIG. 5 is a schematic diagram of another example of the concave mirror module of the first embodiment of the present invention.

As shown in FIG. 5, which is a schematic diagram of another example of the concave mirror module 3 of the first embodiment of the present invention, wherein the concave mirror module is set in a housing 34, the concave mirror module 3 consists of the concave mirror 31 and multiple reflection lenses 33 for increasing the distance of the optical path L and reflecting the images projected by the imaging projection module 1.

Figure 6:
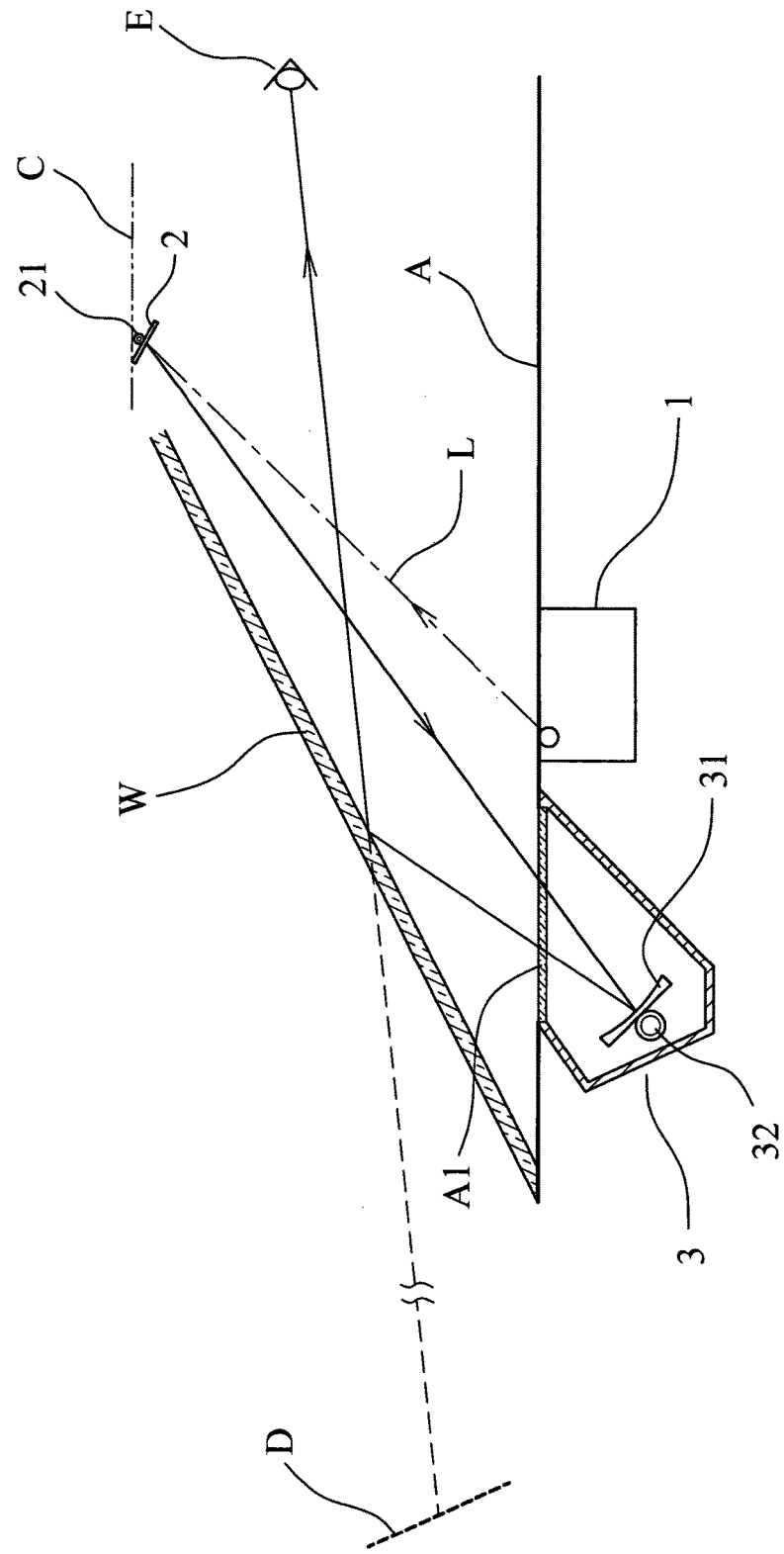
FIG. 6 is a schematic diagram of the second embodiment of the present invention.

As shown in FIG. 6, the second embodiment of the long distance imaging head-up display device of the present invention includes:

an imaging projection module 1, which is set under the dashboard A under the windshield W of the vehicle, is provided to project image light resource, the imaging projection module 1 is a Digital Light Processing (DLP) device, the imaging projection module 1 utilizes the imaging technology used in projectors and rear-projection televisions;

a reflective diffuser 2, which is set on a border between the roof C and the windshield W of the vehicle, optical path L of output light of the imaging projection module 1 is projected on the reflective diffuser 2 and provided to image on the reflective diffuser 2, so that the reflective diffuser 2 is provided to be a screen for displaying images; the reflective diffuser 2 further includes a rotating shaft 21, the rotating shaft 21 is provided to rotate for adjusting the location of images projected below the windshield W;

a concave mirror module 3, which is set on the dashboard under the windshield of the vehicle, the concave mirror module is provided to enlarge images of the reflective diffuser; a concave mirror module 3 is set under the dashboard A, the concave mirror module 3 is covered by a transparent dust cover A1, the concave mirror module 3 includes a concave mirror 31 and a motor gear set 32, a reflection angle of the concave mirror 31 is provided to be adjusted by rotation of the motor gear set 32, the concave mirror module 3 is provided to enlarge images of the reflective diffuser 2 and project to drivers' eyes E;

by the above structure, a longer optical path distance is obtained under the same distance between the reflective diffuser 2 and the concave mirror module 3 without wasting space, wherein principle of virtual imaging is imaging by using the concave mirror 31, the imaging formula of concave mirror is: $1/p+1/q=1/f$, wherein f: focal distance, q: object distance, p: image distance, by using a general magnification, virtual images could be enlarged and virtual image distance could also be farther at the same ratio; thus, the feature is: virtual images are provided to obtain a farther projection distance under the same magnification of the concave mirror 31.

Figure 7:
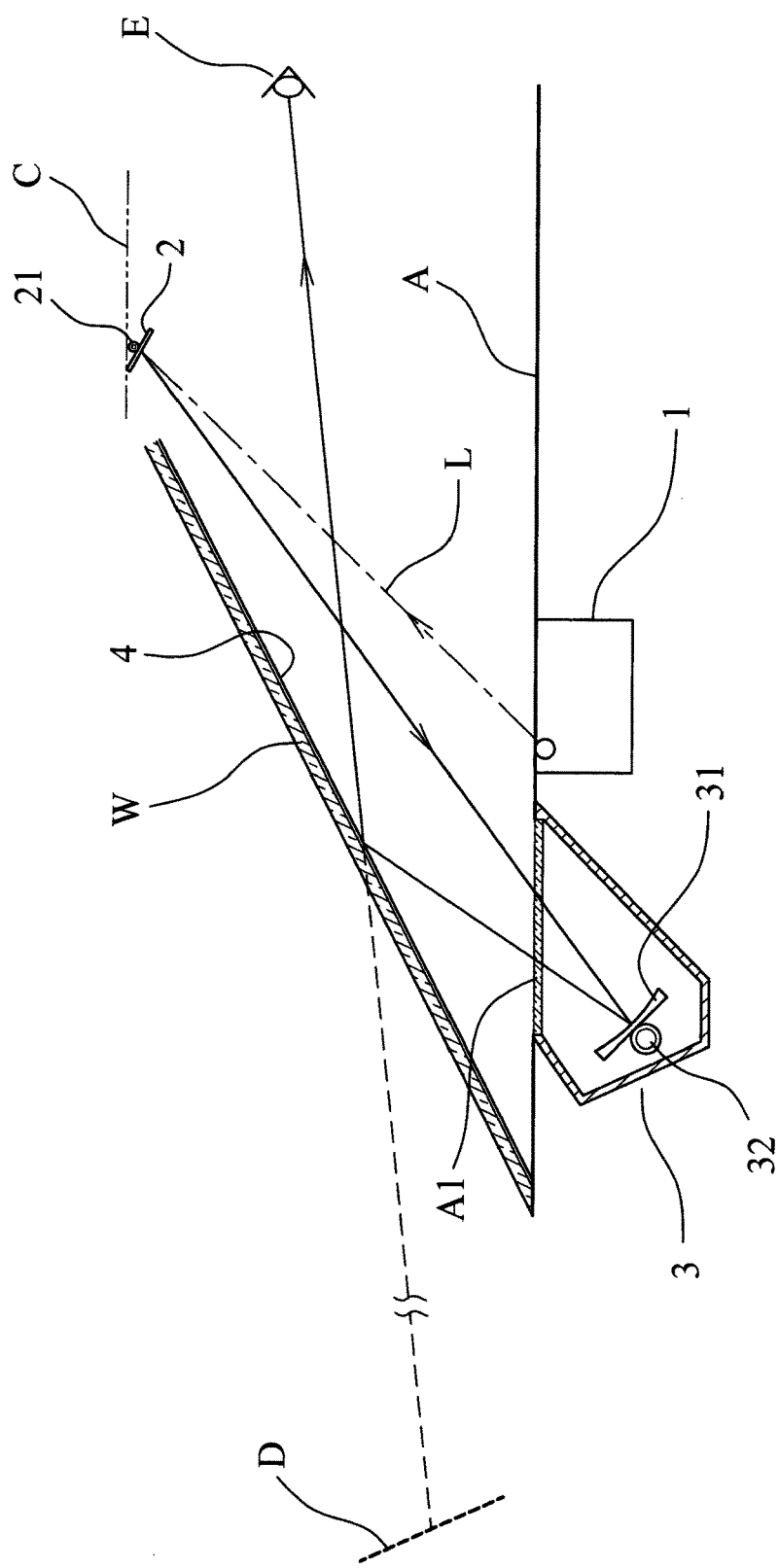
FIG. 7 is a schematic diagram of setting a reflection film on the windshield in the second embodiment of the present invention.

As shown in FIG. 7, the long distance imaging head-up display device further includes a reflection film 4, the reflection film 4 is set on the windshield W to improve reflectivity of the virtual image D, the reflection film 4 is set on an inner side of the windshield W or set in the windshield W (as shown in FIG. 9).

Figure 8:
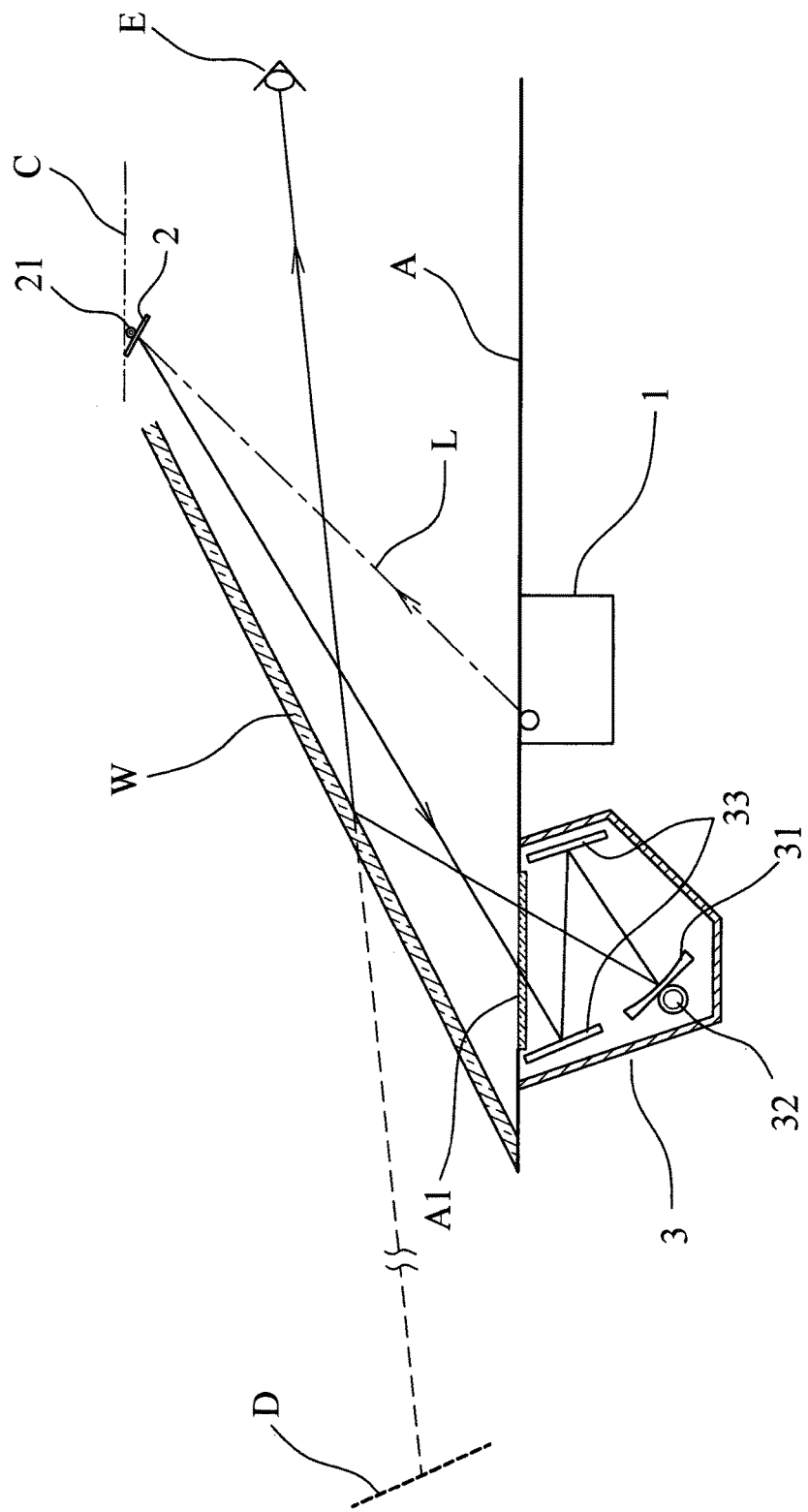
FIG. 8 is a schematic diagram of another example of the concave mirror module of the second embodiment of the present invention.

As shown in FIG. 8, which is a schematic diagram of another example of the concave mirror module 3 of the second embodiment of the present invention, wherein the concave mirror module 3 consists of the concave mirror 31 and multiple reflection lenses 33 for increasing the distance of the optical path L and reflecting the images projected by the imaging projection module 1.

What is claimed is:

1. A long distance imaging head-up display device, including:

an imaging projection module connected to a dashboard under a windshield of a vehicle and projecting an image;

a reflective diffuser located on a border located between a roof and the windshield of the vehicle, output light of the imaging projection module is projected on the reflective diffuser and the image is reflected on the reflective diffuser, the reflective diffuser is provided to be a screen for displaying images;

a concave mirror module connected to the dashboard under the windshield of the vehicle, the concave mirror module is provided to enlarge the image from the reflective diffuser;

wherein an optical path of the image is from the image projection module connected to the dashboard to the reflective diffuser located on the border located between the roof and the windshield of the vehicle, from the reflective diffuser to the concave mirror module connected to the dash board.

2. The long distance imaging head-up display device as claimed in claim 1, wherein the imaging projection module is a Digital Light Processing (DLP) device.

3. The long distance imaging head-up display device as claimed in claim 1, wherein the concave mirror module is set under the dashboard, the concave mirror module is covered by a transparent dust cover.

4. The long distance imaging head-up display device as claimed in claim 1, wherein the concave mirror module is set above the dashboard, the concave mirror module is set in a housing.

5. The long distance imaging head-up display device as claimed in claim 1, wherein the concave mirror module includes a concave mirror and a motor gear set, a reflection angle of the concave mirror is provided to be adjusted by rotation of the motor gear set.

6. The long distance imaging head-up display device as claimed in claim 1, wherein the concave mirror module consists of the concave mirror and multiple reflection lenses.

7. The long distance imaging head-up display device as claimed in claim 1, wherein the reflective diffuser further includes a rotating shaft, the rotating shaft is provided to rotate for adjusting the location of images projected below the windshield.

8. The long distance imaging head-up display device as claimed in claim 1, further includes a reflection film, the reflection film is set on the windshield.

9. The long distance imaging head-up display device as claimed in claim 1, wherein the concave mirror module is provided to enlarge images of the reflective diffuser and project to drivers' eyes.

10. The long distance imaging head-up display device as claimed in claim 1, wherein the concave mirror module is provided to enlarge images of the reflective diffuser and project to the windshield, to thereby reflect to drivers' eyes by the windshield.

* * * * *